(12) United States Patent
Trivi et al.

(10) Patent No.: US 10,127,920 B2
(45) Date of Patent: Nov. 13, 2018

(54) ACOUSTIC PARAMETER ADJUSTMENT (71) Applicant: GOOGLE LLC, Mountain View, CA (US)

(72) Inventors: Jean-Michel Trivi, Boulder Creek, CA (US); Moonseok Kim, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/401,366

(22) Filed: Jan. 9, 2017

(65) Prior Publication Data
US 2018/0197560 A1    Jul. 12, 2018

(51) Int. Cl.
*G10L 19/14*  (2006.01)
*G10L 21/0232*  (2013.01)
*G10L 25/51*  (2013.01)
*G10L 21/0364*  (2013.01)
*G10L 25/72*  (2013.01)
(Continued)

(52) U.S. Cl.
CPC ...... *G10L 21/0232* (2013.01); *G10L 21/0364* (2013.01); *G10L 25/51* (2013.01); *G10L 25/72* (2013.01); *H04M 3/002* (2013.01); *G10L 2021/02082* (2013.01)

(58) Field of Classification Search
USPC .......... 704/200–230, 233, 500–504
See application file for complete search history.

(56) References Cited

U.S. PATENT DOCUMENTS 7,346,315 B2    3/2008  Zurek et al.
8,320,974 B2    11/2012 Nicholson
(Continued)

FOREIGN PATENT DOCUMENTS

CN    1728729    2/2006
CN    105228072    1/2016
(Continued)

OTHER PUBLICATIONS

International Search Report and Written Opinion issued in International Application No. PCT/US2017/056460, dated Apr. 7, 2018, 10 pages.

(Continued)

*Primary Examiner* — Huyen Vo
(74) *Attorney, Agent, or Firm* — Fish & Richardson P.C.

(57) ABSTRACT

Methods, systems, and apparatus, including computer programs encoded on a computer storage medium, for adjusting acoustic parameters. In one aspect, a method includes receiving an identifier associated with an enclosure for a computing device, transmitting data identifying the identifier associated with the enclosure for the computing device, and receiving one or more physical parameters of the enclosure for the computing device. The method also includes based on the one or more physical parameters of the enclosure for the computing device, determining, one or more acoustic parameter adjustments of the computing device in the enclosure, the one or more acoustic parameter adjustments being configured to preserve one or more acoustic characteristics of the computing device out of the enclosure while the computing device is in the enclosure, and based on the one or more acoustic parameter adjustments, adjusting the one or more acoustic parameters of the computing device.

17 Claims, 5 Drawing Sheets

(51) Int. Cl.
*H04M 3/00* (2006.01)
*G10L 21/0208* (2013.01)

(56) References Cited

U.S. PATENT DOCUMENTS

| | | | |
|---|---|---|---|
| 8,897,455 B2 | 11/2014 | Visser et al. | |
| 9,232,071 B2 | 1/2016 | Visser et al. | |
| 9,269,367 B2 | 2/2016 | Strommer et al. | |
| 2002/0037738 A1 | 3/2002 | Wycherley et al. | |
| 2005/0009579 A1 | 1/2005 | Chen et al. | |
| 2010/0080084 A1 | 4/2010 | Chen et al. | |
| 2011/0086626 A1 | 4/2011 | Ken | |
| 2013/0053102 A1 | 2/2013 | Inagaki | |
| 2013/0279707 A1 | 10/2013 | Tagaeto et al. | |
| 2014/0219490 A1 | 8/2014 | Quinn et al. | |
| 2014/0337016 A1* | 11/2014 | Herbig | H04M 3/568 704/201 |
| 2015/0066500 A1* | 3/2015 | Gomez | G10L 15/20 704/233 |
| 2015/0110275 A1 | 4/2015 | Tammi et al. | |
| 2016/0019909 A1* | 1/2016 | Shi | H04M 9/082 704/226 |
| 2016/0125891 A1 | 5/2016 | Nyshadham et al. | |
| 2016/0227336 A1 | 8/2016 | Sakri et al. | |
| 2016/0262028 A1 | 9/2016 | Reddy et al. | |

FOREIGN PATENT DOCUMENTS

| | | |
|---|---|---|
| TW | 201027514 | 7/2010 |
| TW | 201128980 | 8/2011 |
| WO | WO 2000/74350 | 12/2000 |

OTHER PUBLICATIONS

TW Office Action issued in Taiwanese Office Action issued in Taiwanese application No. 106136827, dated Jul. 19, 2018, 6 pages (English Translation).

* cited by examiner

ACOUSTIC PARAMETER ADJUSTMENT

BACKGROUND

The present specification relates to protective cases for mobile computing devices.

Computing devices such as mobile phones often use multiple microphones to improve the quality of a user's voice for telephony and VoIP. The multiple microphones may be used for features such as noise suppression and echo cancellation.

SUMMARY

Acoustic parameters of computing devices are generally tuned when the computing devices are "bare," or not in an enclosure. However, when a computing device is secured to an enclosure, acoustic characteristics of the computing device may change. If a computing device is secured to an enclosure and maintains the acoustic parameters that are tuned for the computing device out of an enclosure, the acoustic characteristics of the computing device may deteriorate.

The methods described in this specification may automatically adjust acoustic parameters of a computing device in an enclosure. Using an identifier associated with an enclosure, the computing device can identify physical parameters of the enclosure. The physical parameters of the enclosure can be used to determine acoustic parameter adjustments of the computing device when the computing device is in the enclosure. Based on the determined acoustic parameter adjustments, the computing device can adjust acoustic parameters of the computing device to maintain desired acoustic characteristics when the computing device is in the enclosure.

In some implementations, methods for adjusting acoustic parameters of a computing device include tuning a computing device to a particular acoustic configuration when the computing device is to be secured in an enclosure. The computing device can be tuned to account for excessive feedback between a speaker and a microphone of the computing device. Specifically, the computing device can be tuned to account for feedback that occurs when the computing device is secured to an enclosure. For example, the computing device can receive little to no feedback when in a first mode, such as speakerphone mode, and when not secured to an enclosure. However, while the computing device remains in the first mode and is secured to the enclosure, the feedback received by the computing device may increase. In this instance, the mode of the computing device and/or the acoustic parameters corresponding to mode of the computing device, may be adjusted to account for the feedback that results from the computing device being secured to the enclosure. In certain aspects, the computing device may adjust the acoustic parameters of the computing device according to physical parameters of the enclosure. The physical parameters of the enclosure may be received or determined by the computing device. The physical parameters be determined using an identifier associated with the enclosure and/or by the computing device performing self-diagnostic tests that determine the physical parameters of the enclosure by comparing generated and received audio.

One innovative aspect of the subject matter described in this specification is embodied in methods that include the actions of receiving, by a computing device, an identifier associated with an enclosure for the computing device, transmitting, by the computing device, data identifying the identifier associated with the enclosure for the computing device, and receiving, by the computing device, one or more physical parameters of the enclosure for the computing device. The methods can also include the actions of based on the one or more physical parameters of the enclosure for the computing device, determining, by the computing device, one or more acoustic parameter adjustments of the computing device in the enclosure, the one or more acoustic parameter adjustments being configured to preserve one or more acoustic characteristics of the computing device out of the enclosure while the computing device is in the enclosure, and based on the one or more acoustic parameter adjustments, adjusting, by the computing device, the one or more acoustic parameters of the computing device.

Other implementations of this and other aspects include corresponding systems, apparatus, and computer programs, configured to perform the actions of the methods, encoded on computer storage devices.

Implementations may each optionally include one or more of the following features. For instance, the methods can include determining that a user mode of the computing device is speakerphone mode, wherein the mode includes a set of predefined acoustic parameters, wherein adjusting the one or more acoustic parameters is based on determining that the use mode of the computing device is speakerphone mode. The methods can also include determining that a use mode of the computing device is handset mode or headset mode, and based on determining that the use mode of the computing device is handset mode or headset mode, adjusting the one or more acoustic parameters to the one or more acoustic parameters of the computing device out of the enclosure.

In certain aspects, the methods can include generating by a speaker of the computing device, reference audio, receiving, by a microphone of the computing device, the generated reference audio, and comparing the reference audio to the received reference audio, wherein adjusting the one or more acoustic parameters is based on comparing the reference audio to the received reference audio. The methods can further include determining that the enclosure is secured on the computing device, wherein adjusting the one or more acoustic parameters is based on determining that the enclosure is secured on the computing device.

In some aspects, the one or more physical parameters can include one or more of a material type of the enclosure, dimensions of the enclosure, and physical properties of the enclosure. The identifier can include one or more of a web address, a tag, a barcode, a matrix barcode, a uniquely identifiable series of characters, and a wireless passive communication tag. Additionally, the one or more acoustic parameter adjustments can include one or more of echo cancellation, echo reduction, noise cancellation, noise reduction, feedback cancellation, feedback reduction, adaptive gain control, speaker protection, frequency response calibration, and wind noise suppression.

Advantageous implementations can include one or more of the following features. The methods for adjusting acoustic parameters can increase the performance of audio processing features for voice communications of a computing device. The methods can be used to minimize the reception of muffled audio due to the computing device being secured to an enclosure. The methods can also be used to account for and reduce echoes that occur when audio is received by the computing device as it is secured to an enclosure. In some aspects, the methods for adjusting acoustic parameters of a computing device can use identifiers associated with enclosures to identify physical parameters of the enclosures. The physical parameters of the enclosures can be used by the computing device to automatically adjust acoustic parameters of the computing device. By adjusting the acoustic parameters of the computing device, the computing device can enhance the reception and transmission of audio. In other aspects, the methods can include the computing performing self-diagnostic tests that seek to compare audio signals against noise signals. By adjusting the acoustic parameters of the computing device, the computing device can be configured to reduce the levels of unwanted audio and/or noise signals. The methods can include a plurality of different acoustic configurations for the computing device that correspond to a variety of different enclosures and modes of the computing device. The plurality of different acoustic configurations can maintain acoustic features of the computing device without an enclosure, while the computing device is secured to an enclosure.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

This document discloses methods, systems, and devices that are used to adjust acoustic parameters of a computing device that is secured to an enclosure. As discussed in more detail below, the methods of the present disclosure address acoustic aspects of a computing device when the computing device is secured to an enclosure. The methods include adjusting acoustic parameters of the computing device based on physical properties of the enclosure. The acoustic parameters can be adjusted so that acoustic characteristics of the computing device out of the enclosure are preserved while the computing device is in the enclosure. The acoustic parameters can be adjusted according to tuning that occurs as a result of receiving information associated with an identifier. In some aspects, the identifier can correspond to a particular enclosure. For example, the computing device may identify an identifier that corresponds to the particular enclosure and receive physical parameters of the particular enclosure based on the identifier. In this instance, the computing device can be configured to adjust acoustic parameters based on the received physical parameters that correspond to the identifier of the enclosure.

Figure 1:
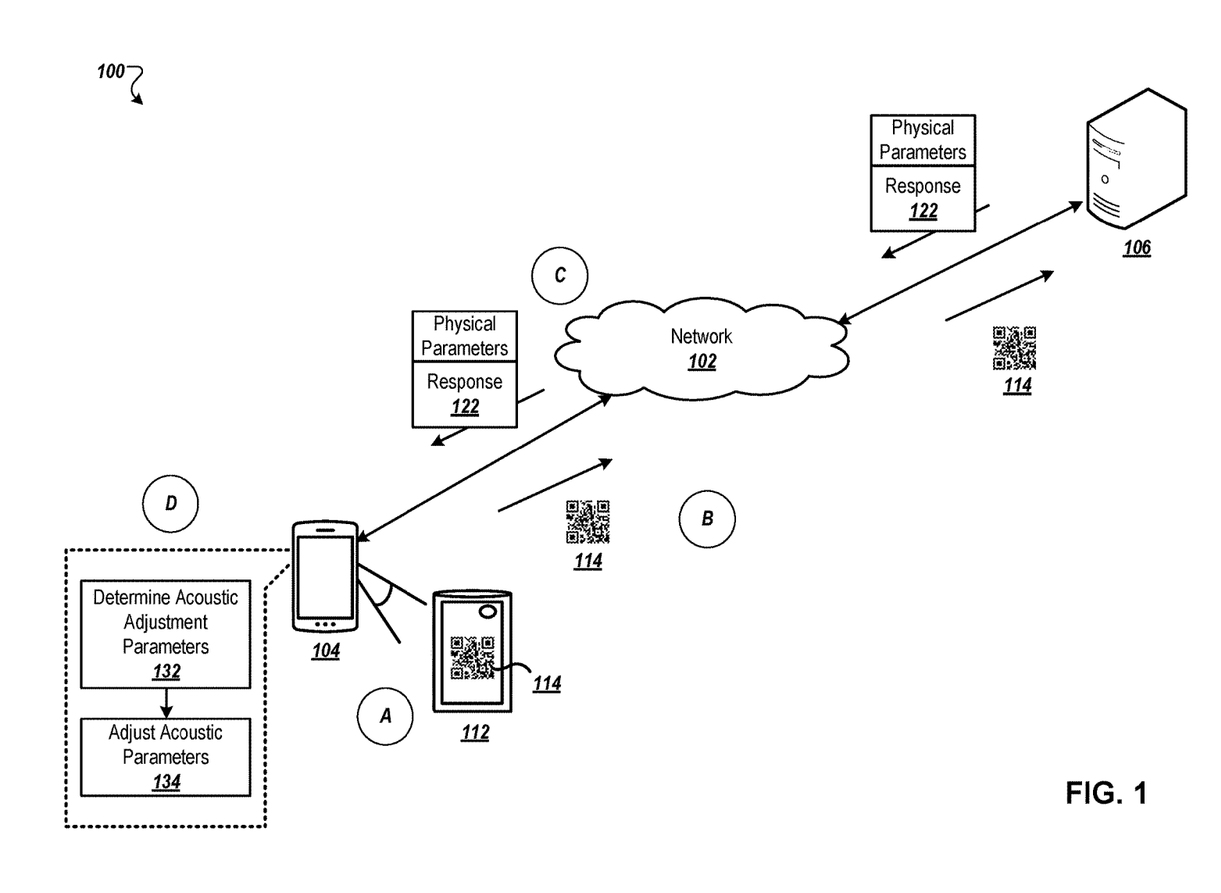
FIG. 1 is a diagram of an example system for adjusting acoustic parameters of a computing device.

FIG. 1 is a diagram of an example system 100 for adjusting acoustic parameters of a computing device. The example system 100 includes a network 102, such as a local area network (LAN), a wide area network (WAN), the Internet, or any combination thereof. The network 102 connects a computing device 104 and a server 106. The example system 100 may include many different computing devices 104 and servers 106.

The computing device 104 is an electronic device that is capable of requesting and receiving resources over the network 102. Example computing devices 104 include personal computers, mobile communication devices, and other devices that can send and receive data over the network 102. The computing device 104 is also capable of adjusting acoustic parameters of the computing device 104 based on received resources such as physical parameters of enclosures.

At event (A), the computing device 104 can be configured to receive resources such as an identifier 114 associated with an enclosure 112. The identifier 114 can be located on the enclosure 112. The identifier can also be located on a container that stores the enclosure 114. For example, the identifier 114 may be located on the inside of the enclosure 114. In this instance, the identifier 114 may be hidden from plain sight when secured to the computing device 104. In another example, the enclosure 112 may be stored in a container prior to being secured to the computing device 104. In this instance, the identifier 114 may be located at the container of the enclosure 112, rather than on the enclosure 112 itself. The identifier 114 can include one or more identifiers such as a web address, a tag, a barcode, a matrix barcode, a uniquely identifiable series of characters, a passive wireless communication tag, and the like. The identifier 114 may be unique to the enclosure 112 or may correspond to one or more particular enclosures.

The enclosure 112 can include a case or container that may be secured to the computing device 104. The enclosure 112 may be used to protect the computing device 104 from damages such as physical damage, water damage, and the like. The enclosure 112 can be pre-packaged in a container, and removed from the container to be secured to the computing device 104. The enclosure 112 can include physical parameters that define characteristics of the enclosure 112. The physical parameters can include a material type of the enclosure 112, dimensions of the enclosure 112, physical properties of the enclosure 112, and the like.

Referring again to event (A), the computing device 104 can be configured to receive the identifier 114 corresponding to the enclosure 112. The computing device 104 may receive the identifier 114 via a camera of the computing device 104. For example, the computing device 104 may take a picture of the identifier 114, and process the contents of the identifier 114 for transmission to the server 106. In another example, the computing device 104 may be configured to persistently scan an environment using a camera of the computing device 104. In this instance, the computing device 104 may be configured to recognize the identifier 114 within the environment, and extract data identifying the identifier when recognized. In another example, the computing device 104 may be configured to receive the identifier 114 corresponding to the enclosure 112 via near field communication (NFC).

In certain aspects, the computing device 104 is configured to identify the enclosure 112 using the identifier 114. In this instance, the computing device 104 may access physical parameters of the enclosure 112 that are stored locally at the computing device 104. The computing device 104 can access the locally stored physical parameters and adjust one or more acoustic parameters of the computing device 104 accordingly.

At event (B), the computing device 104 transmits data associated with the identifier 114 to the server 106. The computing device 104 transmits data associated with the identifier 114 to the server 106 so that the server may transmit physical parameters associated with the enclosure 112 to the computing device 104. The computing device 104 may be configured to transmit the identifier 112 to the server 106. The computing device 104 may also be configured to process the identifier 114, to extract data identifying the identifier 112. For example, the computing device 104 may be configured to extract data from the identifier 112 that identifies the enclosure 114 as a specific enclosure. In this instance, the computing device 104 may be configured to transmit a request to the server 104 that requests physical parameters of the specific enclosure 112.

The server 106 may include data that maps identifiers and/or enclosures to physical parameters of specific enclosures. The data can be stored in a data structure such as a lookup table. For example, the physical parameters and the identifiers of particular enclosures may be mapped to each other in a predetermined lookup table. Upon receiving the request for physical parameters of the enclosure 112, the server 106 can be configured to use the lookup table to access requested information such as physical parameters of the enclosure 112.

In certain aspects, the computing device 104 can be configured to store data that maps identifiers and/or enclosures to physical parameters of specific enclosures. In this instance, the data may be stored locally at the computing device 104 in a data structure such as a lookup table. Thus, the computing device 104 may be configured to process the identifier 114, upon receiving the identifier 114, to determine the physical parameters of the corresponding enclosure 112.

In some aspects, the server 106 may receive data from a manufacturer of the enclosure 112. The data can include the physical parameters of the enclosure 112. Additionally, or alternatively, the identifier 114 may include data that points to a server associated with the manufacturer. The server associated with the manufacturer can include information corresponding to the enclosure 112 such as the physical parameters of the enclosure. The server associated with the manufacturer may be separate from the server 106 and in communication with the server 106 via the network 102. Alternatively, the server 106 may be the server associated with the manufacturer.

At event (C), the server 106 accesses the physical parameters of the enclosure 112 using the identifier 114 and/or data associated with the identifier 114. The server 106 may access the physical parameters of the enclosure 112 using the predetermined data structure. The server 106 is also configured to transmit the physical parameters of the enclosure 112 as a response 122 to the initial request from the computing device 104. The response 112 can include one or more physical parameters of the enclosure 112. In certain aspects, the response 122 can include data indicating that the identifier 114 and/or the data associated with the identifier 114 is not mapped to a particular enclosure. In this instance, the server 106 may be configured to generate a response 122 indicating that the identifier 114 is not associated with an enclosure. The server 106 can be configured to transmit the response 122 to the client device 104.

At event (D), the computing device 104 receives the response 122 from the server 106 and processes the response 112 to tune acoustic features of the computing device 104. For example, the computing device 104 may be configured to receive physical parameters of the enclosure 112 and determine one or more acoustic parameter adjustments 132 based on the received physical parameters. The acoustic parameter adjustments may be determined based on the dimensions, material, or other physical properties of the enclosure 112. As such, the computing device 104 can determine acoustic adjustment parameters including echo cancellation and/or reduction, noise cancellation and/or reduction, feedback cancellation and/or reduction, and the like. In certain aspects, the computing device 104 may include one or more microphones and one or more speakers. In this instance, the computing device 104 can determine acoustic adjustment parameters further including microphone gain adjustment, microphone equalization parameters, speaker gain adjustment, speaker equalization adjustment, speaker non-linear processing (e.g., multi-band compressor) adjustment, and the like. In an example, when the computing device 104 is secured to the enclosure 112, the enclosure 112 may act as a filter on the speakers of the computing device 104. In this instance, the computing device 104 may adjust the equalization of the speakers to account for the enclosure 112 acting as a filter.

The acoustic adjustment parameters can be determined by the computing device 104 in order to preserve acoustic characteristics of the computing device 104. Specifically, the acoustic adjustment parameters can be configured to preserve acoustic characteristics of the computing device 104 out of the enclosure 112 while the computing device 104 is in and/or secured on the enclosure 112. In certain aspects, the acoustic characteristics of the computing device 104 out of the enclosure 112 may not be fully preserved while the computing device 104 is in the enclosure 112. In this instance, the computing device 104 can be configured to preserve as many of the acoustic characteristics as possible. The computing device 104 may select particular acoustic characteristics (e.g., echo levels) to preserve and adjust a select number of acoustic parameters accordingly. For example, the computing device 104 may tune a select number of microphones of the computing device 104 if feedback between a speaker of the computing device 104 and a particular microphone of the computing device 104 cannot be corrected. In another example, the computing device 104 may adjust the role of a microphone to preserve certain acoustic characteristics. In this instance, the computing device 104 may adjust the microphone from being a noise reference, that compares audio input to predetermined noise signals, to a voice reference, that compares audio input to predetermined voice signals.

Further, the computing device 104 can be configured to adjust one or more acoustic parameters 134 of the computing device 104 using the determined acoustic adjustment parameters 132. For example, the computing device 104 can determine acoustic adjustment parameters 132 to reduce echo levels of received audio data. The computing device 104 can then determine a time and a level of received audio data, so that the computing device 104 may adjust acoustic parameters 134 that enable echo levels of audio data to be lowered to a predetermined echo threshold. In this instance, the predetermined echo threshold may be the same when the computing device 104 is out of the enclosure 112 and when the computing device 104 is in the enclosure. As such, the acoustic parameters may be adjusted to account for the computing device 104 being secured to the enclosure 112, so that the echo levels resulting from the computing device 104 being secured to the enclosure 112 can be accounted for by the acoustic parameter adjustment 134.

In certain aspects, the server 106 can be configured to determine acoustic parameter adjustments for the computing device 104. In this instance, the server 106 can use the identifier 114 of the enclosure 112 as well as data identifying the computing device 104 to determine acoustic parameters adjustments for the computing device 104. The server 106 can also be configured to provide the determined acoustic parameter adjustments to the computing device 104 via the response 122. As such, the response 122 may include instructions for adjusting acoustic parameters of the computing device 104.

The computing device 104 can provide an acknowledgement when the identifier 114 is identified by the computing device 104. In this instance, the acknowledgment can include a visual representation of the identifier 114 that is provided at a user interface of the computing device 104. The acknowledgement can also include audial feedback and tactile feedback, or any combination of visual, audial, and tactile feedback provided by the computing device 104.

The computing device 104 can also provide an acknowledgment when the computing device 104 is determined to be secured to the enclosure 112. The acknowledgment can include audial feedback, visual feedback, tactile feedback, or any combination thereof. The acknowledgment can indicate that the acoustic characteristics of the computing device 104 may be altered by the computing device 104 being secured to the enclosure 112. In this instance, the computing device 104 can be configured to provide a notification at the user interface the computing device 104 indicating that acoustic adjustment may occur to account for the altered acoustic characteristics of the computing device 104 in the enclosure 112.

The computing device 104 can further provide an acknowledgement when the acoustic parameter adjustment is occurring and/or complete. The acknowledgment can include audial feedback, visual feedback, tactile feedback, or any combination thereof. The acknowledgment can indicate that the acoustic parameters are presently being adjusted, or that the acoustic parameters have changed to preserve acoustic characteristics of the computing device 104.

Figure 2:
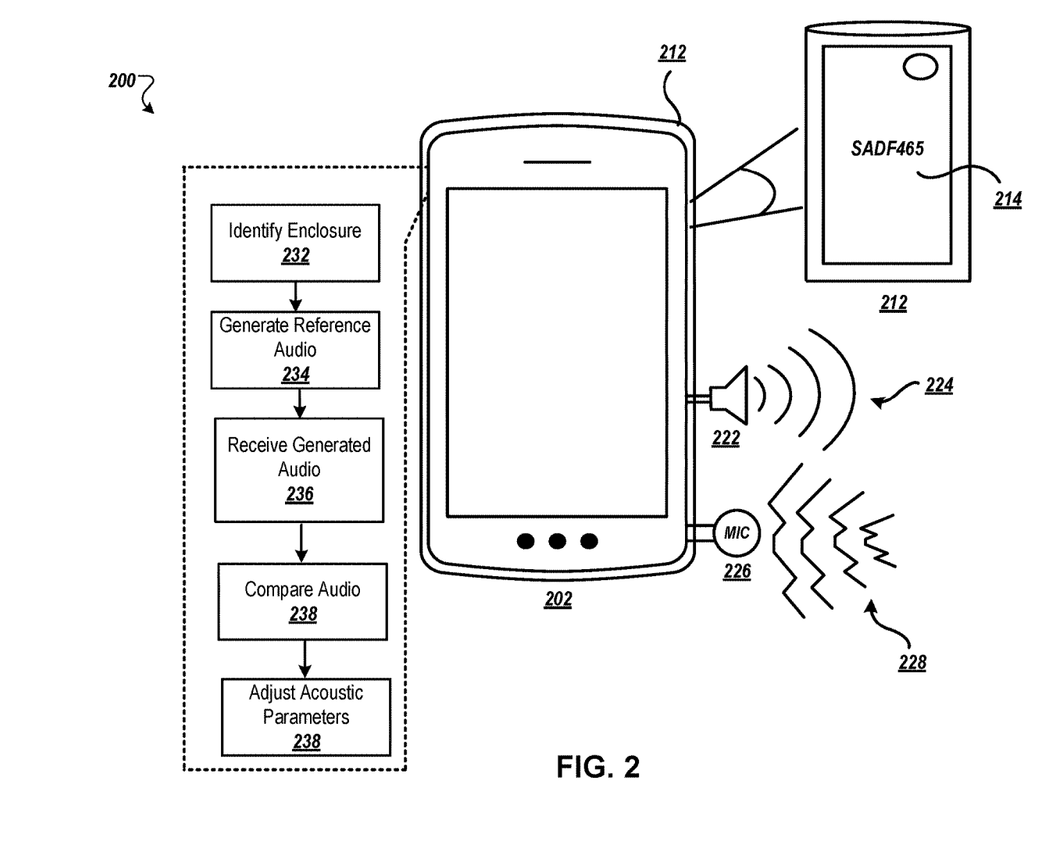
FIG. 2 is a diagram of an example system for adjusting acoustic parameters of a computing device.

FIG. 2 is a diagram of an example system 200 for adjusting acoustic parameters of a computer device. The system 200 includes a computing device 202 and an enclosure 212. The computing device 202 is an electronic device that is capable of receiving an identifier and adjusting acoustic parameters based on data associated with the identifier. Example computing devices 202 include personal computers, mobile communication devices, and other devices that can receive and process data.

The computing device 202 can be configured to receive an identifier 214 associated with the enclosure 212 via a camera of the computing device 202. For example, the computing device 202 may take a picture of the identifier 214, to process the contents of the identifier 214. In another example, the computing device 202 may be configured to persistently scan an environment using a camera of the computing device 202. In this instance, the computing device 104 may be configured to recognize the identifier 214 within the environment, and extract data identifying the identifier when recognized.

In some aspects, the computing device 202 may be unable to identify the enclosure 232 from the identifier 214 and/or data associated with the identifier 214. In this instance, the computing device 202 may include self-diagnostic capabilities that are used to determine the acoustic characteristics of the computing device 104 in the enclosure 212. The computing device may be configured to determine the acoustic characteristics in real-time or near real-time. For example, the computing device 202 can further include a speaker 222 for generating audio and a microphone 226 for receiving audio. In response to not identifying the enclosure 232 from the identifier 214, the computing device 202 may be configured to generate reference audio 232 by the speaker 222 of the computing device 202. The reference audio 224 can be emitted by the computing device 202 and include audio signals that are predetermined at the computing device 202. The computing device 202 may be configured to receive audio signals 228, including the generated reference audio 224, by the microphone 226 of the computing device 202. As such, the computing device 202 may receive generated audio 236 that includes the initial reference audio 224, noise, echoes corresponding to the initial reference audio, and the like.

The computing device 202 can be configured to initiate the self-diagnostic sequence on command. For example, the computing device 202 can receive input via a user interface of the computing device 202 that instructs the computing device 202 to adjust acoustic parameters of the computing device 202. In another example, the computing device 202 can be configured to perform the self-diagnostic sequence in response to determining that the computing device 202 is secured in the enclosure 212.

The computing device 202 can provide acknowledgments via the user interface of the computing device 202 when the self-diagnostic sequence is initiated, when the self-diagnostic sequence is being performed, and/or when the self-diagnostic sequence is complete. The acknowledgements can include one or more of visual feedback, audial feedback, and tactile feedback at the computing device 202.

The computing device 202 can be configured to compare 238 the reference audio 224 to the received reference audio 228. Using the known audio signals of the reference audio 224, the computing device 202 can be configured to determine unwanted audio signals existing in the received reference audio 228. Based on the comparison 238, the computing device 202 can be configured to identify raw echo levels, environmental audio signals, feedback, and the like.

In response to comparing the reference audio 224 to the received reference audio 228, the computing device 202 can adjust acoustic parameters of the computing device 202. Specifically, the computing device 202 may adjust acoustic parameters of the computing device 202 so that acoustic parameters of the computing device 202 out of the enclosure 212 are maintained while the computing device 202 is secured to the enclosure 212.

Figure 3:
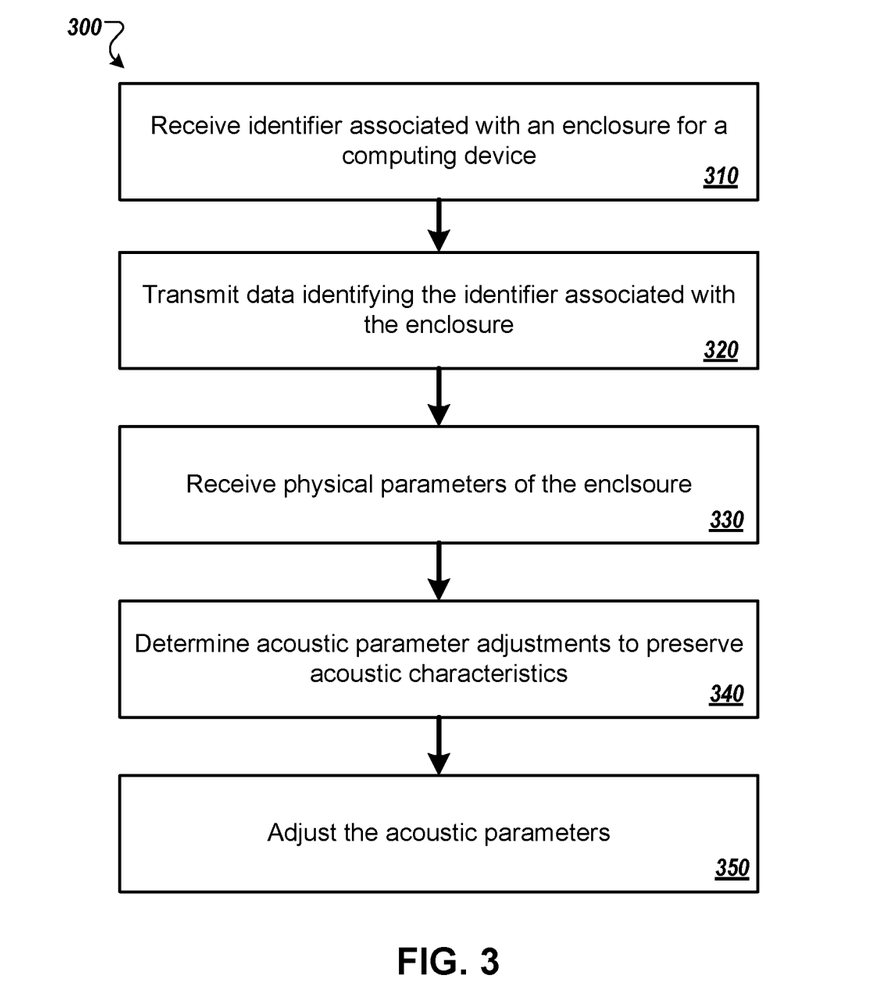
FIG. 3 is a flow chart illustrating an example process for adjusting acoustic parameters.

FIG. 3 is a flow chart illustrating an example process 300 for adjusting acoustic parameters. The process 300 can be performed by one or more servers or other computing devices. For example, operations of the process 300 can be performed by computing device 104 of FIG. 1. Operations of the process 300 can also be implemented as instructions stored on a non-transitory computer readable medium, and when the instructions are executed by one or more servers (or other computing devices), the instructions cause the one or more servers to perform operations of the process 300.

At step 310, a computing device receives an identifier associated with an enclosure for the computing device. The identifier may be scanned by a camera of the computing device. The identifier may be included in a picture taken by the camera of the computing device. The identifier can be located on the enclosure or on a container of the enclosure. The identifier may include a web address, a tag, a barcode, a matrix barcode, a uniquely identifiable series of characters, a wireless passive communication tag, and the like. Specifically, the identifier can be used to identify a particular enclosure. For example, the identifier can include a QR code that encodes data that associates the identifier with a specific enclosure.

At step 320, the computing device transmits data identifying the identifier associated with the enclosure. The computing device can transmit data of the identifier to a server. The transmitted data can include the identifier itself, or data that corresponds to the received identifier. The identifier may be transmitted in real-time or near real-time as the identifier is received by the computing device. In some aspects, the data identifying the identifier is stored locally on the computing device. The data identifying the identifier can be accessed and transmitted to the server after a predetermined amount of time, or when input is received at the computing device to perform the transmission.

At step 330, the computing device receives physical parameters of the enclosure. The physical parameters of the enclosure may be accessed by the server using the data identifying the identifier. The physical parameters of a plurality of different enclosures may be stored at the server and associated with data identifying the identifiers of each of the enclosures. The server can be configured to access physical parameters corresponding to identifiers received by the computing device. Additionally, the server can be configured to determine when the data identifying the identifier is not matched to a particular enclosure. In this instance, the server may be configured to transmit a response indicating that the data is not associated with a particular enclosure to be received by the computing device.

At step 340, the computing device determines acoustic parameter adjustments to preserve acoustic characteristics. Specifically, the computing device determines acoustic parameter adjustments of the computing device when the computing device is in the enclosure. The acoustic parameters adjustments can be configured to preserve acoustic characteristics of the computing device out of the enclosure while the computing device is in the enclosure. The acoustic parameter adjustments can include changing one or more acoustic parameters of the computing device to preserve acoustic characteristics of the computing device while it is in the enclosure.

At step 350, the computing device adjusts acoustic parameters of the computing device. Specifically, the computing device adjusts acoustic parameters of the computing device based on the determined acoustic parameters adjustments. The computing device can adjust the acoustic parameters to alter characteristics of the computing device when the computing device is in or secured to the enclosure. The characteristics of the computing device may be different for different modes of the computing device. The modes of the computing device can include a speakerphone mode, a headset mode, a handset mode, a hands-free mode, and the like. Each of the modes can include a predefined set of acoustic parameters. As such, when the computing device changes modes, the computing device may automatically adjust the acoustic parameters.

In an example, the computing device can be configured to determine that the computing device is in speakerphone mode and that the speakerphone mode corresponds to a predefined set of acoustic parameters. If the computing device determines that the computing device is in speakerphone mode, the computing device can be configured to automatically adjust acoustic parameters of the computing device. In this instance, the computing device may automatically adjust the acoustic parameters according to a predefined set of acoustic parameter adjustments. In certain aspects, the computing device can be configured to determine that the computing device is in handset mode or headset mode. In response to determining that the computing device is in handset mode or headset mode, the computing device may adjust acoustic parameters of the computing device based on the acoustic characteristics of the computing device out of the enclosure. In this instance, the computing device may be configured to automatically adjust the acoustic parameters according to acoustic characteristics of the computing device out of the enclosure when the computing device is in handset or headset modes. The computing device can also be configured to determine that the computing device is secured to the enclosure. As a result, the computing device may adjust acoustic parameters of the computing device based on determining that the enclosure is secured on the computing device.

In certain aspects, the acoustic parameters may only be adjusted when the computing device is in speakerphone mode. In this instance, if the computing device is determined to be in handset or headset mode, the computing device may return to unadjusted acoustic parameters. As such, the computing device may be secured to the enclosure, but if the computing device is in handset or headset mode, the computing device changes to the initial, or unadjusted, acoustic parameters.

Figure 4:
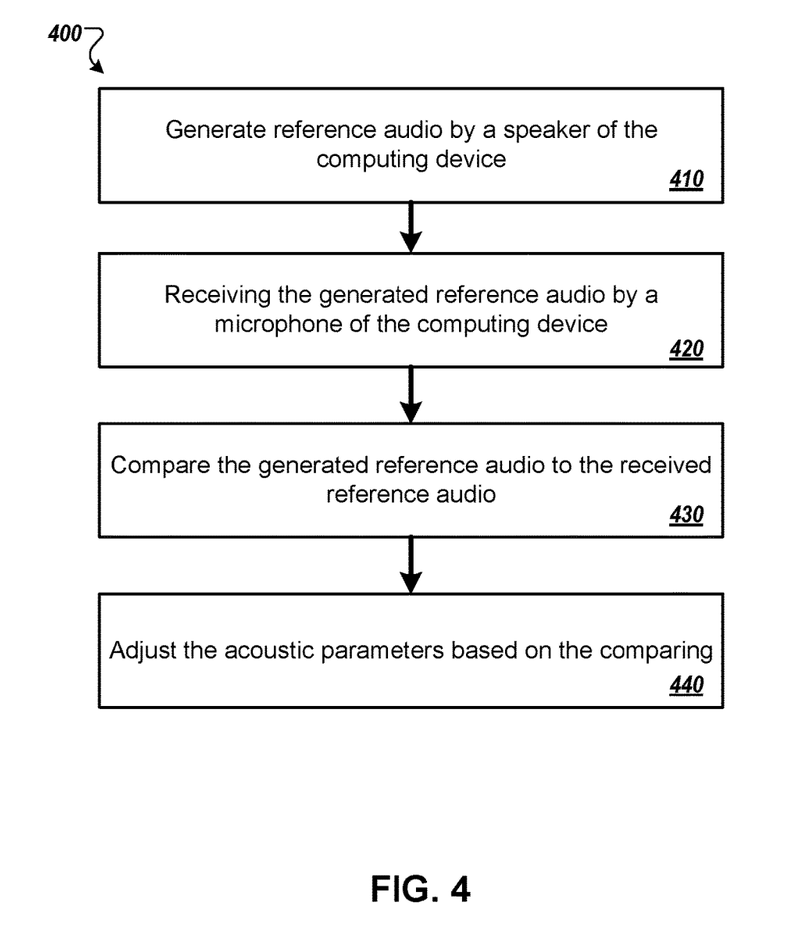
FIG. 4 is a flow chart illustrating an example process for adjusting acoustic parameters using reference audio.

FIG. 4 is a flow chart illustrating an example process 400 for adjusting acoustic parameters using reference audio. The process 400 can be performed by one or more servers or other computing devices. For example, operations of the process 400 can be performed by computing device 104 of FIG. 1. Operations of the process 400 can also be implemented as instructions stored on a non-transitory computer readable medium, and when the instructions are executed by one or more servers (or other computing devices), the instructions cause the one or more servers to perform operations of the process 400.

At step 410, the computing device generates reference audio by a speaker of the computing device. The computing device can be configured to emit a predefined audio signal by the speaker. For example, the computing device can emit reference audio via the speaker while the computing device is secured to the enclosure. The reference audio may correspond to a known audio signal that is received when the computing device is out of the enclosure. The computing device may generate the reference audio to contrast the reference audio with audio that is received while the computing device is in the enclosure. In certain aspects, the computing device automatically generates the reference audio when the computing device is determined to be secured to the enclosure.

At step 420, the computing device receives the generated reference audio by a microphone of the computing device. The computing device receives the generated reference audio in part to tune the acoustic settings of the computing device in real time. In some implementations, the computing device may generate reference audio and receive the generated reference audio when a particular enclosure is determined to be unidentified by an identifier associated with the particular enclosure. As such, the computing device may use the generated reference signal and the received reference signal to determine physical parameters of the enclosure.

At step 430, the computing device compares the generated reference audio to the received reference audio. The computing device may perform the comparison to differentiate audio signals from noise signals. As such, the computing device can perform the comparison to effectively determine acoustic parameter adjustments while the computing device is in an enclosure that includes unidentified physical properties. In certain aspects, the computing device can determine physical properties of the unidentified enclosure based on the comparison. Further, the computing device may be configured to use the determined physical properties to determine acoustic parameter adjustments that are configured to preserve acoustic characteristics of the computing device out of the enclosure while the computing device is in the enclosure.

At step 440, the computing device adjusts the acoustic parameters based on the comparing. The computing device can be configured to adjust the acoustic parameters to a predefined tuning that includes a predetermined set of acoustic parameters based on the comparing. The computing device can also be configured to determine adjustments to the acoustic parameters based on the comparing. The computing device may adjust the acoustic parameters in real-time or near real-time as the comparing is performed.

As an example, the computing device may adjust acoustic parameters based on received audio data that includes audio feedback or echoes. In this instance, a first echo level may be determined when the computing device is out of the enclosure and a second echo level may be determined when the computing device is in the enclosure. The first and second echo levels may be compared to determine that the second echo level is greater than the first echo level. As such, the computing device may be configured to determine that acoustic parameters require tuning so that the second echo level is suppressed. The second echo level may be suppressed to maintain acoustic characteristics of the computing device out of the enclosure.

In another example, the computing device may use one or more speakers to emit audio at the computing device. The computing device may determine that the feedback received by a microphone of the computing device is greater when the computing device is in the enclosure than when the computing device is not in the enclosure. In this instance, the computing device may determine acoustic parameter adjustments that lower the feedback while the computing device is in the enclosure. In response to determining the acoustic parameter adjustments, the computing device may be configured to adjust the level of audio emission by at least one of the speakers of the computing device. As such, the computing device may be configured to emit audio out of only one of the speakers when the computing device is in the enclosure. The computing device may only emit audio out of one of the speakers to suppress the total amount of received feedback.

Figure 5:
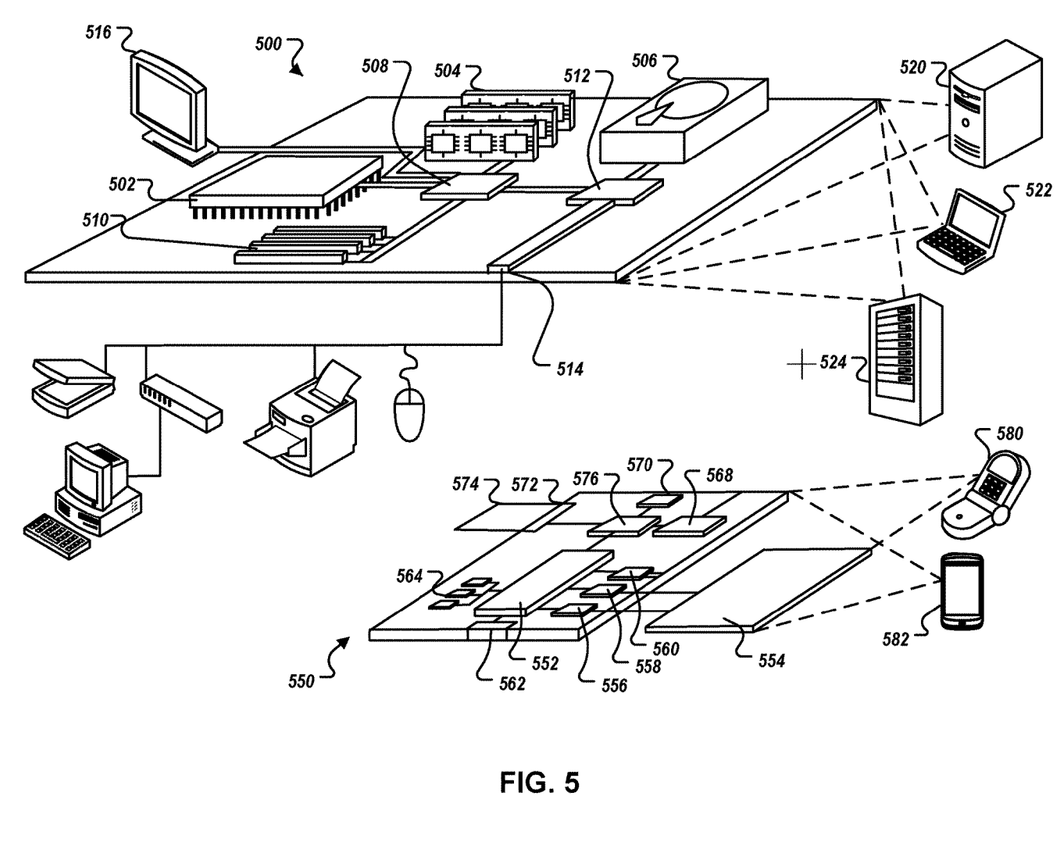
FIG. 5 is a diagram of an example of a computer device and a mobile computer device.

FIG. 5 is a diagram of an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 504, the storage device 506, or a memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 may execute instructions within the computing device 540, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 548 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 554 may also be provided and connected to device 550 through expansion interface 552, which may include, for example, a SIMM (Single In Line Memory Module) card interface. Such expansion memory 554 may provide extra storage space for device 550, or may also store applications or other information for device 550. Specifically, expansion memory 554 may include instructions to carry out or supplement the processes described above, and may include secure information also. Thus, for example, expansion memory 554 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 554, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 550 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A computer-implemented method, comprising:
receiving, by a mobile device, an identifier of a case for the mobile device;
transmitting, by the mobile device, the identifier of the case for the mobile device;
receiving, by the mobile device, one or more physical parameters of the case of the mobile device;
based on the one or more physical parameters of the case of the mobile device, determining, by the mobile device, one or more acoustic parameter adjustments that preserve one or more acoustic characteristics of the mobile device unattached to the case, while the case is attached to the mobile device;
determining, by the mobile device, that the case is attached to the mobile device; and
based on determining that the case is attached to the mobile device, adjusting, by the mobile device, the one or more acoustic parameters of the mobile device according to the one or more acoustic parameter adjustments.

2. The method of claim 1, comprising:
determining that a use mode of the mobile device is speakerphone mode, wherein adjusting the one or more acoustic parameters is based on determining that the use mode of the mobile device is speakerphone mode.

3. The method of claim 1, comprising:
determining that a use mode of the mobile device is handset mode or headset mode; and
based on determining that the use mode of the mobile device is handset mode or headset mode, setting, by the mobile device, the adjusted one or more acoustic parameters to the one or more acoustic parameters.

4. The method of claim 1, comprising:
generating, by a speaker of the mobile device, reference audio;
receiving, by one or more microphones of the mobile device, the generated reference audio; and
comparing, by the mobile device, the reference audio to the received reference audio;
wherein adjusting the one or more acoustic parameters is based on comparing the reference audio to the received reference audio.

5. The method of claim 1, wherein the one or more physical parameters of the case include one or more of a material type of the case, dimensions of the case, and physical properties of the case.

6. The method of claim 1, wherein the identifier of the case includes one or more of a web address, a tag, a barcode, a matrix barcode, a uniquely identifiable series of characters, and a wireless passive communication tag.

7. The method of claim 1, wherein the one or more acoustic parameter adjustments include one or more of echo cancellation, echo reduction, noise cancellation, noise reduction, feedback cancellation, feedback reduction, adaptive gain control, speaker protection, frequency response calibration and wind noise suppression.

8. A system, comprising:
one or more computers and one or more storage devices storing instructions that are operable, when executed by the one or more computers, to cause the one or more computers to perform operations including:
receiving, by a mobile device, an identifier of a case for the mobile device;
transmitting, by the mobile device, the identifier of the case for the mobile device;
receiving, by the mobile device, one or more physical parameters of the case of the mobile device;
based on the one or more physical parameters of the case of the mobile device, determining, by the mobile device, one or more acoustic parameter adjustments that preserve one or more acoustic characteristics of the mobile device unattached to the case, while the case is attached to the mobile device;
determining, by the mobile device, that the case is attached to the mobile device; and
based on determining that the case is attached to the mobile device, adjusting, by the mobile device, the one or more acoustic parameters of the mobile device according to the one or more acoustic parameter adjustments.

9. The system of claim 8, wherein the operations comprise:
determining that a use mode of the mobile device is speakerphone mode,
wherein adjusting the one or more acoustic parameters is based on determining that the use mode of the mobile device is speakerphone mode.

10. The system of claim 8, wherein the operations comprise:
determining that a use mode of the mobile device is handset mode or headset mode; and
based on determining that the use mode of the mobile device is handset mode or headset mode, setting, by the mobile device, the adjusted one or more acoustic parameters to the one or more acoustic parameters.

11. The system of claim 8, wherein the operations comprise:
generating, by a speaker of the mobile device, reference audio;
receiving, by one or more microphones of the mobile device, the generated reference audio; and
comparing, by the mobile device, the reference audio to the received reference audio;
wherein adjusting the one or more acoustic parameters is based on comparing the reference audio to the received reference audio.

12. The system of claim 8, wherein the one or more physical parameters of the case include one or more of a material type of the case, dimensions of the case, and physical properties of the case.

13. A non-transitory computer storage medium encoded with a computer program, the program comprising instructions that when executed by data processing apparatus cause the data processing apparatus to perform operations comprising:
receiving, by a mobile device, an identifier of a case for the mobile device;
transmitting, by the mobile device, the identifier of the case for the mobile device;
receiving, by the mobile device, one or more physical parameters of the case of the mobile device;
based on the one or more physical parameters of the case of the mobile device, determining, by the mobile device, one or more acoustic parameter adjustments that preserve one or more acoustic characteristics of the mobile device unattached to the case, while the case is attached to the mobile device;
determining, by the mobile device, that the case is attached to the mobile device; and
based on determining that the case is attached to the mobile device, adjusting, by the mobile device, the one or more acoustic parameters of the mobile device according to the one or more acoustic parameter adjustments.

14. The non-transitory computer storage medium of claim 13, wherein the operations comprise:
determining that a use mode of the mobile device is speakerphone mode,
wherein adjusting the one or more acoustic parameters is based on determining that the use mode of the mobile device is speakerphone mode.

15. The non-transitory computer storage medium of claim 13, wherein the operations comprise:
determining that a use mode of the mobile device is handset mode or headset mode; and
based on determining that the use mode of the mobile device is handset mode or headset mode, setting, by the mobile device, the adjusted one or more acoustic parameters to the one or more acoustic parameters.

16. The non-transitory computer storage medium of claim 13, wherein the operations comprise:
generating, by a speaker of the mobile device, reference audio;
receiving, by one or more microphones of the mobile device, the generated reference audio; and comparing, by the mobile device, the reference audio to the received reference audio;

wherein adjusting the one or more acoustic parameters is based on comparing the reference audio to the received reference audio.

17. The non-transitory computer storage medium of claim 13, wherein the one or more physical parameters of the case include one or more of a material type of the case, dimensions of the case, and physical properties of the case.

\* \* \* \* \*